United States Patent
Nakamoto et al.

(10) Patent No.: US 6,359,106 B1
(45) Date of Patent: Mar. 19, 2002

(54) PRODUCTION PROCESS AND PRODUCTION APPARATUS FOR POLYBUTYLENE TEREPHTHALATE

(75) Inventors: Hidekazu Nakamoto; Susumu Harada; Norifumi Maeda, all of Kudamatsu; Shuji Yamaguchi, Tokuyama, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/642,587

(22) Filed: Aug. 22, 2000

(30) Foreign Application Priority Data

Mar. 9, 2000 (JP) .................... 2000-070986

(51) Int. Cl.$^7$ .................... C08G 63/00; C08G 85/00
(52) U.S. Cl. .................... 528/308.6; 528/272; 528/503; 526/64; 526/65; 526/71; 422/131; 422/132; 422/188; 422/243
(58) Field of Search .................... 528/272, 308.6, 528/503; 526/64, 65, 71; 422/131, 132, 188, 243

(56) References Cited

U.S. PATENT DOCUMENTS 4,680,376 A 7/1987 Heinze et al.

FOREIGN PATENT DOCUMENTS

| JP | 51-81897 | 7/1976 |
| JP | 52-51495 | 4/1977 |

*Primary Examiner*—Samuel A. Acquah
(74) *Attorney, Agent, or Firm*—Antonelli, Terry, Stout & Kraus, LLP

(57) ABSTRACT

Polybutylene terephthalate having good heat stability and excellent hydrolysis resistance is continuously produced in a series of a first reactor for reacting an aromatic dicarboxylic acid comprising terephthalic acid as a main ingredient or a derivative thereof with a glycol comprising 1,4-butanediol as a main ingredient, thereby producing an oligomer with an average degree of polymerization of 2.2 to 5, a second reactor for polycondensating the oligomer from the first reactor, thereby preparing a low polymerization product with an average degree of polymerization of 25 to 40, and a third reactor for further polycondensating the low polymerization product from the second reactor, thereby producing a high molecular weight polyester with an average degree of polymerization of 70 to 130, or followed by a fourth reactor for further polycondensing the polyester from the third reactor to an average degree of polymerization of 150 to 200, thereby producing a high molecular weight polyester. Another third reactor or a plurality of third reactors can be provided in parallel to the third reactor, thereby producing different kinds of polybutylene phthalate with different degrees of polymerization from that produced in the main line of the third and fourth reactors or adjusting operating conditions of each of a plurality of the third reactors to increase kinds, precise quality.

11 Claims, 3 Drawing Sheets

PRODUCTION PROCESS AND PRODUCTION APPARATUS FOR POLYBUTYLENE TEREPHTHALATE

BACKGROUND OF THE INVENTION

1) Field of the Invention

The present invention relates to a process and an apparatus for continuously producing polyester type polymers such as polybutylene terephthalate and polyethylene terephthalate.

2) Related Art

Since polyethylene terephthalate (hereinafter referred to as PBT) resins are excellent in the crystallizing characteristic and also excellent in mechanical properties, electric characteristics and heat resistance, they have been used for applications such as electric machines, electronic parts, mechanical parts and automobiles and their demand has been increased steadily.

Heretofore, for the general PBT production process, a terephthalic acid alkyl ester comprising dimethyl terephthalate as a main ingredient and a glycol comprising 1,4-butanediol (hereinafter referred to as BD) as a main ingredient are placed at an appropriate ratio in a mixing vessel, a transesterification catalyst is added and conditioned and then they are sent to a transesterfication reaction vessel set to a predetermined reaction temperature by a pump. In the transesterification reaction, two or three stirring vessels with stirring blades are disposed in series and methanol formed as reaction by-products, and tetrahydrofuran (hereinafter referred to as THF) formed by decomposition of the methanol formed as reaction by-products and BD and water are separated in a distillation tower. Then, a polymerization catalyst is added and the process proceeds to the polymerizing reaction step. At first, vertical stirring vessels or horizontal stirring vessels are disposed in plurality for the prepolymerization step and, further, a horizontal stirring vessel is disposed as a final polymerization step. In the vessels for the polymerization step, a condenser is disposed for removing BD, THF and water formed as reaction by-products and the step is operated in a reduced pressure atmosphere at high temperature. In the existent continuous PBT reaction step, the number of the reaction vessels is 4 to 6, a stirring blade and a power source therefor are installed in each of the reaction vessels, and a distillation column or a condenser for separating and removing the reaction by-products are disposed.

In these production steps described above, since the products are exposed in a reaction state at high temperature for a long time, a portion of the resin formed by polymerizing reaction is broken at the bond sites by thermal decomposing reaction to lower the degree of polymerization and increase the acid value of the resin (carboxyl group concentration at the terminal end of the polymer), to worsen the quality. Further, since the polymerization step is operated in an reduced pressure atmosphere, it is necessary that the evacuation unit has to be operated by an additional device, and high maintenance cost and high installation cost are required for the operation of the apparatus.

SUMMARY OF THE INVENTION

An object of the present invention is to improve the well known processes for producing a high molecular weight polybutylene terephthalate with improved efficiently for the entire apparatus and economical operation upon energy saving throughout the plant facility.

An object of the present invention is to improve the prior art described above and provide a continuous polycondensation apparatus and a continuous polycondensation process for efficiently producing polymers of favorable moldability excellent in heat stability and resins of excellent hydrolysis resistance with minimum energy while suppressing thermal decomposition during production of the resin with necessary minimum reactors constitution.

The foregoing objects can be attained by using terephthalic acid (hereinafter referred to as TPA) and BD as the starting material for the production of PBT, conducting the direct esterifying reaction step and the polymerizing reaction step in three or four reaction vessels, thereby minimizing the number of vessels requiring stirring power and shortening the residence time to minimize the heat hysteresis at high temperatures during production of the resin and decreasing the number of unreacted terminal carboxyl groups in the resin.

Typical embodiments of the present invention are summarize below.

(1) An apparatus for continuously producing polybutylene terephthalate, which comprises a first reactor for reacting an aromatic dicarboxylic acid comprising terephthalic acid as a main ingredient or a derivative thereof with a glycol comprising 1,4-butanediol as a main ingredient, thereby producing an oligomer with an average degree of polymerization of 2.2 to 5, a second reactor for polycondensating the oligomer from the first reactor, thereby preparing a low polymerization product with an average degree of polymerization of 25 to 40, and a third reactor for further polycondensating the low polymerization product from the second reactor, thereby producing a high molecular weight polyester with an average degree polymerization of 70 to 130 with good heat stability and excellent hydrolysis resistance, or an apparatus for continuously producing polybutylene terephthalate, which comprises a first reactor for reacting an aromatic dicarboxylic acid comprising terephthalic acid as a main ingredient or a derivative thereof with a glycol comprising 1,4-butanediol as a main ingredient, thereby producing an oligomer with an average degree of polymerization of 2.2 to 5, a second reactor for polycondensating the oligomer from the first reactor, thereby preparing a low polymerization product with an average degree of polymerization of 25 to 40, a third reactor for further polycondensating the low polymerization product from the second reactor, thereby producing a high molecular weight polyester with an average degree polymerization of 70 to 130, and a fourth reactor for further polycondensing the polyester from the third reactor to an average degree of polymerization of 150 to 200, thereby producing a high molecular weight polyester with good heat stability and excellent hydrolysis resistance, characterized in that (i) reactors without any stirrers by an external power source is used for the first and second reactors, (ii) the first reactor is an approximately cylindrical vessel type reactor having an inlet and an outlet for a process solution at lower parts, respectively, of the vessel proper and an outlet for volatile matters and reaction by-products at the upper part of the vessel proper, and having a calandria type heat exchanger formed in the longitudinal direction of the vessel proper and near the inside wall of the vessel proper and being immersed in the process solution, the process solution supplied into the vessel proper at the inlet at the lower part thereof is heated to a predetermined reaction temperature by the heat exchanger and is stirred and mixed by spontaneous connection due to a density difference caused by a temperature difference between the formed volatile by-product gas and the process solution, (iii) the second reactor is an approximately cylindrical vessel type flow reactor in a double cylinder structure having an inner cylinder opening in the vessel and an inlet for the process solution at the lower part of the double cylinder structure, the process solution passing through tubes of a shell and tube type provided on the outside of the inner cylinder of the double cylinder structure and thereby heated to a predetermined temperature and passed upwardly to the level of the inner cylinder opening and then flowing down through the inner cylinder and the vessel proper being provided with an outlet for volatile matters and reaction by-products at the upper part thereof, (iv) the third reactor is a horizontal cylindrical vessel type reactor having an inlet and an outlet for a process solution at lower parts on one end and an another end in the longitudinal direction of the vessel proper, respectively, and an outlet for volatile matters at the upper part of the vessel proper, and a stirring rotor rotating in the proximity of the inside wall of the vessel proper is provided in the longitudinal direction of the vessel proper, the stirring rotor in the vessel proper is provided with a plurality of stirring blade blocks in accordance with the viscosity of the process solution and the stirring blades are without any rotating shaft along the center of the stirring rotor, and (v) the fourth reactor is a horizontal, approximately cylindrical vessel type reactor having an inlet and an outlet for a process solution at lower parts an one end and an another end in the longitudinal direction of the vessel proper, respectively, and an outlet for volatile matters at the upper part of the vessel proper, the reactor has two stirring rotors rotating in the proximity of the inside wall of the vessel proper in the longitudinal direction of the vessel proper, and the rotors each have stirring blades.

(2) A process for continuously producing polybutylene terephthalate, which comprises a first step of reacting an aromatic dicarboxylic acid comprising terephthalic acid as a main ingredient or a derivative thereof with a glycol comprising 1,4-butanediol as a main ingredient in a first reactor, thereby producing an oligomer with an average degree of polymerization of 2.2 to 5, a second step of polycondensing the oligomer from the first step in a second reactor, thereby preparing a low polymerization product with an average degree of polymerization of 25 to 40, and a third step of further polycondensing the low polymerization product from the second step in a third reactor to an average degree of polymerization of 70 to 130, thereby producing a high molecular weight polyester with good heat stability and excellent hydrolysis resistance, or a process for continuously producing polybutylene terephthalate, which comprises a first step of reacting an aromatic dicarboxylic acid comprising terephthalic acid as a main ingredient or a derivative thereof with a glycol comprising 1,4-butanediol as a main ingredient in a first reactor, thereby producing an oligomer with an average degree of polymerization of 2.2 to 5, a second step of polycondensing the oligomer from the first step in a second reactor, thereby preparing a low polymerization product with an average degree of polymerization of 25 to 40, a third step of further polycondensing the low polymerization product from the second step in a third reactor to an average degree of polymerization of 70 to 130, thereby producing a high molecular weight polyester, and a fourth step of further polycondensing the polyester from the third step in a fourth reactor to an average degree of polymerization of 150 to 200, thereby producing a high molecular weight polyester with good heat stability and excellent hydrolysis resistance, characterized in that reactors characterized by (i), (ii), (iii), (iv) and (v) described in the foregoing (1) are use; the aromatic dicarboxylic acid comprising terephthalic acid as a main ingredient or a derivative thereof and the glycol comprising 1,4-butanediol as a main ingredient are supplied to the first step in a molar ratio of the former to the latter of 1:1.7 to 1:30, and the first step is carried out at 220°–250° C. and 33 kPa–150 kPa, the second step at 230°–255° C. and 100 kPa–0.133 kPa and the third and fourth step each at 230°–255° C. and 0.665 kPa–0.067 kPa; the stirring blades of the third and fourth reactors are rotated in a range of 0.5 rpm–10 rpm; total reaction time for the first to the third steps is in a range of 4–7.5 hours, or total reaction time for the first to the fourth step is in a range of 6 to 8.5 hours; a slurry of the aromatic dicarboxylic acid comprising terephthalic acid as a main ingredient or a derivative thereof and the glycol comprising 1,4-butanediol as a main ingredient prepared in a ratio of the former to the latter of 1:1.7 to 1:3.0 is supplied to the first step upon admixture of an esterifying catalyst or a polymerization reaction catalyst; and another third reactor or a plurality of third reactors is provided in parallel to the third reactor in the third step, thereby producing different kinds of polybutylene phthalate with different degrees of polymerization from that produced in the main line of the third and fourth reactors or adjusting operating conditions of each of a plurality of the third reactors to increase kinds, precise quality control and production rate of polybutylene terephthalate.

PREFERRED EMBODIMENTS OF THE INVENTION

Figure 1:
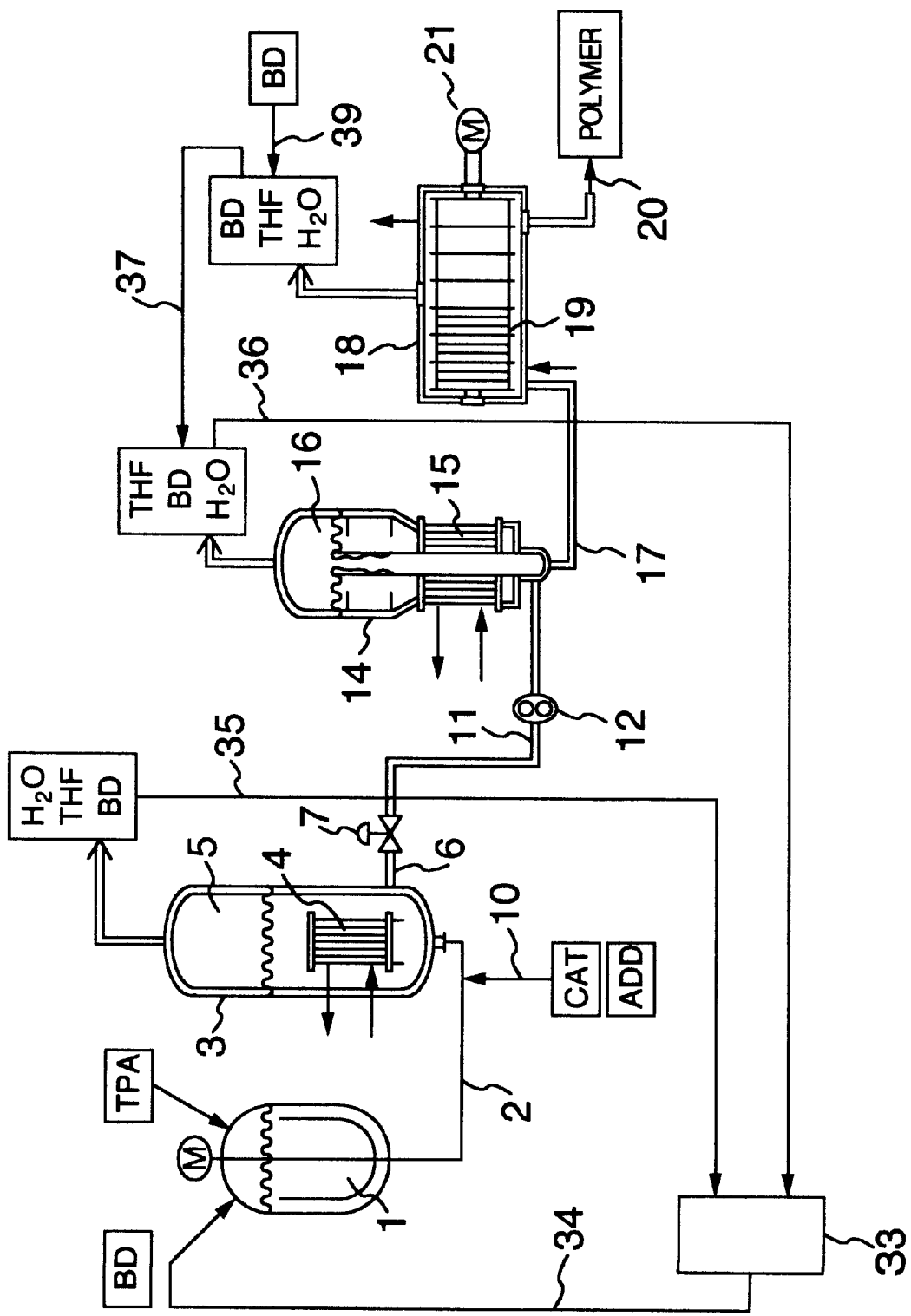
FIG. 1 shows an apparatus layout in a process for continuously producing PBT according to one embodiment of the present invention.

FIG. 1 shows an embodiment of this invention.

FIG. 1 is an apparatus layout of a process for continuously for the producing PBT according to this invention. Since a direct esterifying process is very advantageous from an economical point of view as an industrial process for producing a polyester, the direct esterifying process has been often adopted recently for the production of polyesters. In the drawing, reference numeral 1 denotes a starting material conditioning vessel for mixing and stirring TPA and BD as the starting materials for PBT in a predetermined ratio. In the process, a polymerizing reaction catalyst or additives such as a stabilizer or a quality controller are sometimes added in this step and, in this embodiment, the polymerizing reaction catalyst or the additive is charged to a starting material supply line 2 just before the inlet of an esterifying reaction vessel from a catalyst supply line 10 and supplied to the esterifying reaction vessel. The polymerizing reaction catalyst can include metal compounds such as organic titanium, organic tin, organic zirconia, etc. and it is well known the reaction rate depends on the kind and the combination of the catalyst to be used, as well as they give a significant effect on the quality such as hue and the heat stability of the resultant PBT. In particular, it is well known that the catalyst of the organic titanium compound is influenced with the ambient moisture to decrease the catalytic effect. In order to minimize the effect, the catalyst is added to the point just before the inlet of the esterifying reaction vessel in this embodiment. Since this can minimize the rate of deactivation of the added catalyst, it is possible to decrease the amount of the catalyst charged and produce a resin of good hue. Further, since the reactions are carried out in the presence of the catalyst at high temperature for a long time, various side-reactions take place to color the polymerization product, increase the THF content or the terminal carboxyl group concentration to higher than the appropriate values, thereby deteriorating the quality of PBT or lowering the physical properties such as the strength, etc. While a development for new catalyst has been attempted for improving such problems, organic titanium used most frequently at present in the industry is excellent in view of the cost and the performance. However, the resultant polyester polymer product is inevitably colored even when the catalyst is used. Therefore, improvement has been attempted by the combined use of a phosphorus type stabilizer (for example, phosphoric acid, trimethyl phosphate, triphenyl phosphate, etc.) as the stabilizer. Further, in another process the quality is stabilized by modifying the position for charging the polymerization catalyst and the stabilizer. Preferably, in the ordinary process, the amount of the catalyst used is from 20 to 100 ppm in terms of metallic titanium concentration and the amount of the stabilizer used is from 0 to 600 ppm in terms of metallic phosphorus concentration, if required.

The starting material and the catalyst prepared as described above are supplied to the first esterifying reaction vessel 3 through the supply line 2 for supplying the starting material and a catalyst zz addition line 10 for the catalyst prepared separately, which are joined with the supply line 2, respectively. The outside of the esterifying reaction vessel (first reactor) 3 is in a jacket structure (not illustrated) to keep the process solution at the reaction temperature, a calandria type heat exchanger 4 is disposed in the solution as a solution heating unit, thereby heating the process solution flowing in the tubes by an external heat source, thereby conducting the reaction while circulating the internal solution only by the spontaneous circulation due to a synergistic effect between the change of the density caused by the volatile gas formed in the esterifying reaction step and the temperature difference. The most desired type of the reactor is a calandria type for spontaneously circulating the process solution in the reactor by utilizing the spontaneous evaporating action of side reaction products formed by the esterifying reaction. Since the reactor of this type does not require an external stirring power source, it has a merit that the apparatus layout can be simplified, a shaft sealing device for a stirring shaft is no more required and the fabrication cost of the reactor is reduced. As an example of such reactor, a device as shown in JP-A-10-85501 is desirable. However, the present invention is not limited to such a device, and it is not objectionable to use a reactor having a stirring blade for a process reason. In the first reactor 3, water formed by reaction takes a steams form, which makes a gas phase 5 together with gasified BD vapors and by-produced THF vapors. A temperature from 220° C. to 250° C. and a reduced pressure or slightly elevated pressure are preferable conditions. In particular as to the pressure condition, an optimum pressure condition is determined in accordance with BD-TPA molar ratio of the starting materials (hereinafter referred to as B/T). In B/T=2.0 or higher, the BD concentration in the process solution can be ensured even under a pressure higher than the atmospheric pressure, the desired esterifying ratio can be reached within a predetermined residence time. However, in B/T=less than 2.0, the esterifying ratio is lowered to increase the reaction load in the subsequent polymerization steps and bring about a problem of causing disadvantage in a vacuum system and auxiliaries relevant thereto. Accordingly, at B/T=less than 2.0, it is effective to set the reaction pressure to a subatmospheric pressure. The pressure reduction can lower the boiling point of BD and lower the reaction temperature. Usually, the reaction rate lowers when the reaction temperature is lowered, but in the spontaneous circulation type reactor of such a structure as in this embodiment, the pressure reduction increases the reaction by-product gas volume to improve the circulating performance within the reactor and give an effect on the improvement of the reaction condition. Further, the pressure reduction can also improve the leaving rate of moisture as a by-product of the esterifying reaction and make a forward reaction rate constant larger. Further, the effects on shortening the esterifying reaction time and decreasing the amount of THF as the side-reaction product become remarkable by the improvement in the esterifying reaction rate with a synergistic effect on lowering the reaction temperature, and thus the amount of THF formed can be reduced remarkably.

Preferable reaction temperature in this case is from 220° C. to 250° C. and, particularly, under subatmospheric pressure of 50 to 80 kPa, the residence time of 1.5 to 2.4 hrs and reaction temperature of 225° C. to 230° C. are remarkably effective for the improvement of the esterifying reaction rate and the decrease of the amount of THF formed. The amount of THF formed in this case is about 15 to 25 mol %/h in terms of molar fraction of the starting material TPA. The gas of the gas phase zone 5 as a volatile component leaving the process solution is separated into water, THF and BD by a distillation column (not shown) disposed above the first esterifying reaction vessel 3. Water and THF are removed from the system and BD is returned through a purification step etc. again into the system or as the starting material to a BD tank 33 from the bottom of the distillation column through a BD recycle line 35. The recycle BD is supplied to the starting material conditioning vessel 1 from BD tank 33 through a BD supply line 34, and the recycle BD in the BD tank 33 is subjected to purify adjustment of the starting material BD by BD purification treatment (not shown), if required. Furthermore, the recycle BD discharged from wet condensers (not shown) at pressure reduction devices disposed at an initial polymerization vessel 14 and a final polymerizer 18 is returned to the BD tank 33 through a BD recycle line 36 to further improve the BD unit. In that case, fresh BD is supplied to the wet condenser at the final polymerizer 18 through a fresh BD supply line 39, then to the wet condenser at the initial polymerization vessel 14 through a BD recycle line 37, and to the BD tank 33 through the BD recycle line 36.

The process solution reaching a predetermined esterifying ratio in the esterifying reaction vessel 3 is supplied through a connection pipe 6 to an initial polymerization vessel (second reactor) 16. A control valve 7 is disposed to adjust the flow rate of the process solution at the midway of the connection pipe 6. The valve 7 controls the first reactor to a constant liquid level and keeps a constant reaction time. The process solution, when reached a predetermined esterifying ratio in the esterifying reaction vessel 3, is supplied to an initial polymerization vessel (second reactor) 14 by an oligomer pump 12 disposed in the midway of a connection pipe 11. The process solution supplied to the initial polymerization vessel is heated to a predetermined reaction temperature by a shell and tube type heat exchanger 15 and subjected to polycondensation reaction to increase the degree of polymerization. Reaction is conducted to a polymerization degree of about 25 to 40 under such reaction conditions as 230° C. to 255° C. and a pressure of 100 kPa to 0.133 kPa for a residence time of 1.0 to 1.5 hrs. The initial polymerization vessel 14 is shown in this embodiment as a reactor having no stirring blade, but the present invention is not limited to such a reactor. However, the reaction at the initial polymerization stage is a polymerizing reaction rate-determining step and the reaction proceeds smoothly if a necessary amount of heat is supplied to the reaction sufficiently. From this point of view, it is not necessary to stir the process solution by stirring blade and it may suffice that BD formed by the polycondensation reaction is removed to the outside of the system. Further, it is preferred that operation is conducted at a reaction temperature as low as possible in order to keep the resin produced with a preferred quality and control the amount of by-produced THF, and the desirable reaction temperature is preferably 250° C. or lower. A suitable reactor for the operation is an apparatus as shown in JP-A-10-76102. BD, water and THF formed by the reaction are collected into a gas phase zone 16 kept under a reduced pressure atmosphere and discharged to the outside of the system upon condensation by a condenser disposed downstream thereof.

The process solution after a predetermined residence time (reaction time) in the initial polymerization vessel (second reactor) 14 is supplied through a connection pipe 17 to the final polymerizer (third reactor) 18. In the final polymerizer, polymer of desired polymerization degree is produced by further polycondensating reaction, while undergoing a good surface renewing effect by stirring blades 19 with no stirring center shaft driven by an external power source 21, thereby increasing the degree of polymerization. A suitable apparatus for the final polymerizer (third reactor) is an apparatus disclosed in JP-A-10-77348 from the viewpoint of the surface renewing effect and the power consumption characteristic. The reaction is conducted to a degree of polymerization of about 70 to about 130 in this case under such reaction conditions as 230° C. to 255° C. and a pressure of 0.665 kPa to 0.067 kPa. Polycondensation has been so far carried out in two vessels due to a wide range of viscosity of the process solution, the present final polymerizer can carry out polycondensation in a single unit, thereby greatly reducing the apparatus cost. Total residence time for the first to third reactors is 4–7.5 hours but from the viewpoint of the quality, the residence time throughout the entire polymerizing steps is preferably in a range from 2 to 4 hours. Further, the residence time can be made longer by adjusting the temperature and the pressure, if required, and, in case of reducing the production rate, for example, this can be carried out to minimize the quality fluctuation. In particular, to keep an acid value of polymer as one of PBT evaluation items as low as possible, it is desirable that the reaction temperature is 250° C. or lower.

When PBT is produced continuously according to the foregoing apparatus layout, the number of reactors is decreased, as compared with the conventional apparatus layout, and thus the apparatus fabrication cost can be reduced, and the number of distillation columns and condensers relevant to the apparatus can be also reduced due to the decrease in the number of the apparatus units. Their connection pipelines, instrumentation parts and valves can be omitted greatly, and utility costs for evacuation means, heating medium means are greatly reduced as well, thereby lowering the running cost as another advantage.

Figure 2:
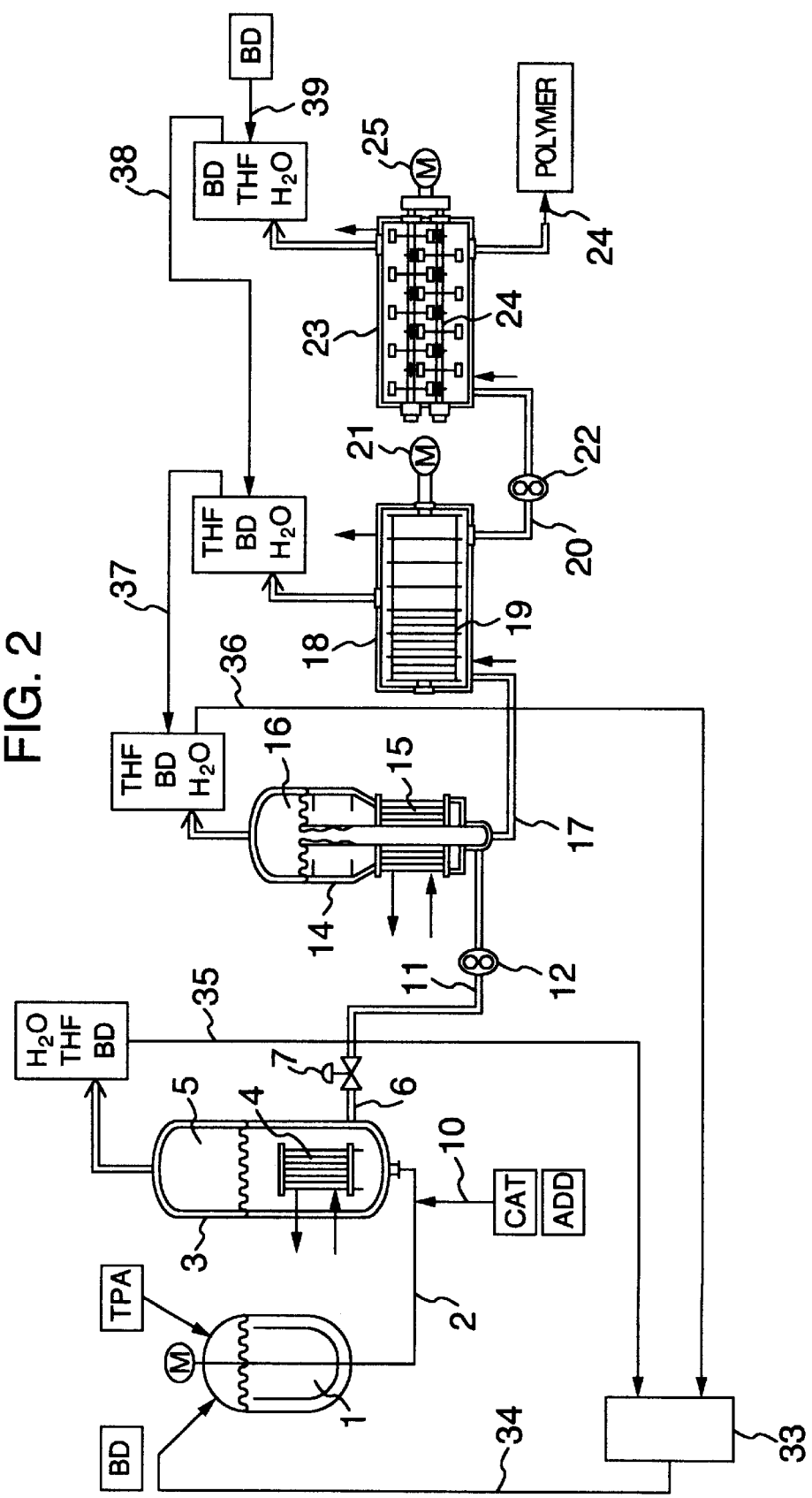
FIG. 2 shows an apparatus layout in a process for continuously producing PBT according to another embodiment of the present invention.

Further, to obtain PBT of higher intrinsic viscosity (IV) another final polymerizer (fourth reactor) can be provided after the final polymerizer (third reactor) 18. This embodiment is shown in FIG. 2. Apparatus layout and functions of first, second and third reactors are the same as described above, referring to FIG. 1 and thus their description is to be omitted below. Fresh BD is supplied to a wet condenser at a fourth reactor 23 and then through a BD recycle line 38 to the wet condenser at the third reactor 23, followed by the same functions as in the embodiment of FIG. 1. Process solution 20 having a degree of polymerization of about 70 to about 130 obtained in the third reactor is supplied to the fourth reactor 23 by a polymer pump 22 at the midway of a connection pipe between the third reactor 18 and the fourth reactor 23. Since the process solution has such a high viscosity as a few hundred kPa·s in the fourth reactor 23, the same stirring device as used in the third reactor 18 is no more used, because a rotation phenomenon, i.e. attachment and staying of the process solution on rotating stirring blades, occurs. That is, a reactor with a stirring device for a high viscosity solution must be used. A suitable reactor is a biaxial reactor for high viscosity solution treatment as disclosed in JP-B-6-21159 and JP-A-48-102894.

In this embodiment, description will be made below, referring to a binocular spectacle rim-type polymerizer disclosed in JP-A-48-102894 (Japanese Patent No. 1024745), but the present invention will not be limited thereto. The fourth reactor 23 is a biaxial polymerization reactor with two stirring shafts each having binocular spectacle rim-type stirring blades 24 as fixed thereto alternately with a phase difference of 90° and at specific distances therebetween, the two stirring shafts being set to each other alternately with a phase difference of 90° and driven by an external power source 25. The process solution supplied from the inlet port is pushed and extended outwardly due to the stirring blade rotating action from the center to the outward direction, where the process solution undergoes a good surface renewing action, thereby evaporating the volatile components from the inside of the process solution and promoting the reaction, with the result of further increase in the viscosity. The process solution is then discharged as polymer 24 having a higher degree of polymerization. The reaction is conducted to a polymerization degree of about 150 to 200 under such reaction conditions as temperature of 230° C. to 255° C., pressure of 0.665 kPa to 0.067 kPa and residence time of 0.7 to 1.5 hours.

Figure 3:
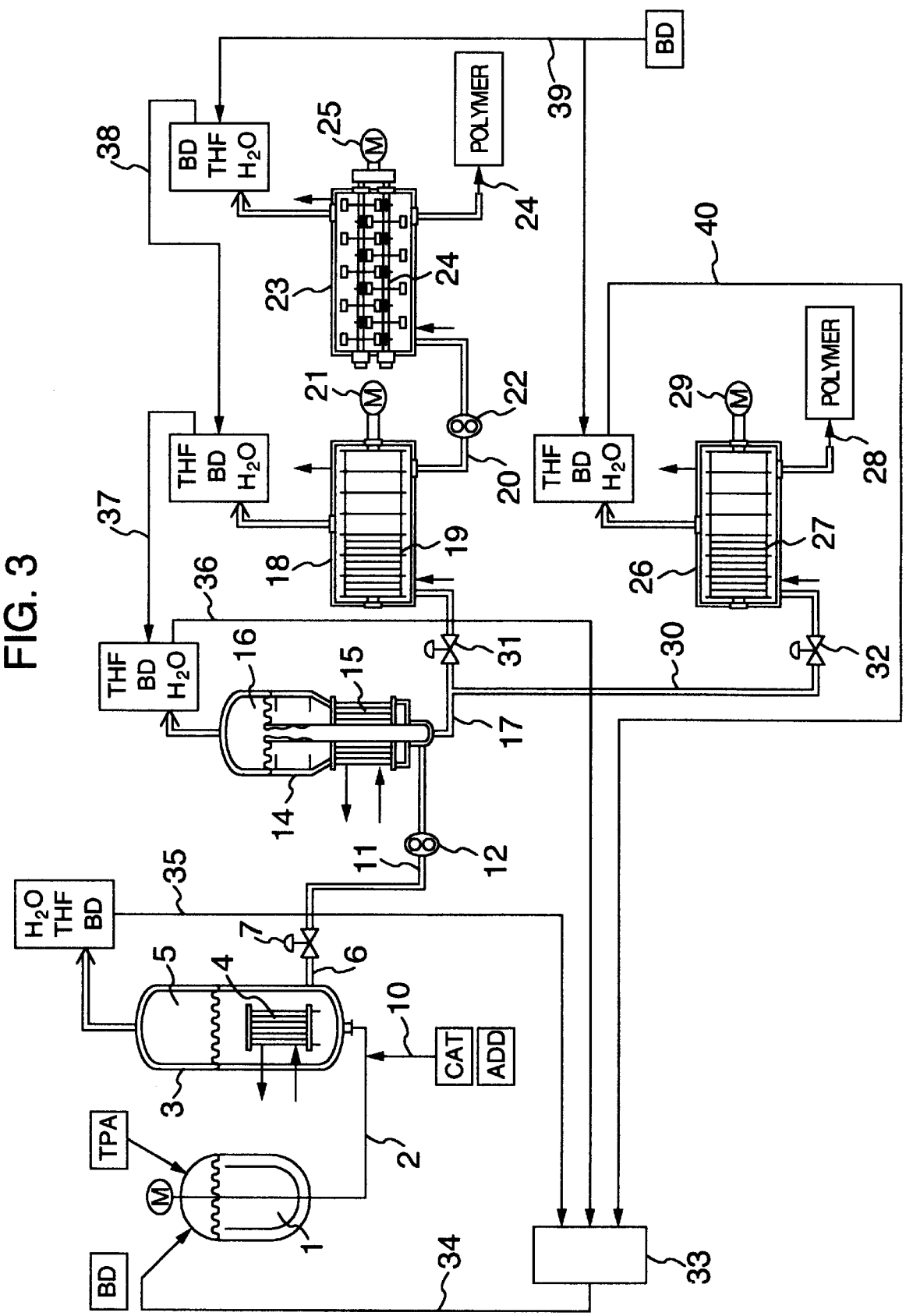
FIG. 3 shows an apparatus layout in a process for continuously producing PBT according to other embodiment of the present invention.

An embodiment of producing different kinds of polybutylene terephthalates at the same time will be described below, referring to FIG. 3. The embodiment of FIG. 3 shows disposition of another third reactor 26 in parallel to the facility of producing polybutylene terephthalate with a high degree of polymerization shown in FIG. 2. Fresh BD is supplied to the wet condensers at the fourth reactor 23 and at the third reactor 26, respectively, through the supply line 39 and finally collected into the BD tank 33 through the BD recycle lines 38, 37 and 36, as described in the embodiments of FIG. 1 and FIG. 2, and also through a BD recycle line 40, respectively. The third reactors 18 and 26 will be described below, referring to the reactor as explained in the embodiment of FIG. 1, but the present invention will not be limited to such a reactor. The process solution leaving the second reactor 14 is divided at the midway of the connection pipe 17 and one portion of the process solution is led to the third reactor 18 through a flow control valves 31 and another divided portion of the process solution is led to the third reactor 26 through a branch connection pipe 30 and a flow control valve 32, respectively. This embodiment shows the division into two portions of the process solution, but the present invention will not be limited thereto.

The one portion of the process solution is passed through the third reactor 18 and the fourth reactor 23 to produce polybutylene terephthalate with a high degree of polymerization. The other divided portion of the process solution was passed through the third reactor 26 to produce polybutylene terephthalate with a lower degree of polymerization. This series of the product polybutylene terephthalates can be produced in any desired proportion by adjusting the flow control valves 31 and 32. A further third reactor can be provided, though not shown in the drawing, to produce a different kind of polybutylene terephthalate, e.g. with a different acid value but the same degree of polymerization or produce polybutylene terephthalate with a little different degree of polymerization or adjust the production rate by setting different reaction conditions from those for the third reactor 26. The stirring blades of the third and fourth reactors are rotated in a range of 0.5 rpm–10 rpm.

According to the present invention, the entire apparatus efficiency can be improved by making an apparatus for continuously producing PBT from total 3 reactors, i.e. one for the direct esterifying step, one for the initial polymerizing step and one for the final polymerizing step, together with an economical operation of the apparatus due to the resulting energy saving.

Furthermore, according to the present invention, PBT with a high degree of polymerization can be produced through bulk polymerization by adding a reactor for high viscosity treatment to an apparatus for continuously producing PBT comprising total 3 reactors, i.e. one for the direct esterifying step, one for the initial polymerizing step and one for the final polymerizing step, together with the energy saving of the apparatus.

Still furthermore, according to the present invention, different kinds of PBT can be produced by dividing the production line following the second reactor of an apparatus for continuously producing PBT into a production line for higher degree of polymerization and another production line for a lower degree of polymerization. Yield of such different kinds of PBT can be adjusted together with economical operation of the apparatus for continuously producing PBT.

EXAMPLES

The present invention will be described in detail below, referring to Examples, to which the present invention will not be limited.

In Examples, an intrinsic was determined with an Ostwald viscometer at 30° C., using a solvent of 50 wt. % phenol and 50 wt. % tetrachloroethane, and acid value was determined by neutralization titration upon dissolution of PBT in benzyl alcohol as a solvent with heating at 230° C. for 5 minutes. As shown in Table 1. PBT was produced by continuous operation of the direct esterifying process of TPA and BD. PBT was produced under esterifying reaction conditions at a reduced pressure in Examples 1 and 2 and under esterifying reaction conditions at a reduced pressure in Example 3, where an intrinsic viscosity of 0.85 dl/g was obtained only by melt polymerization. As shown in Example 1, high quality PBT with an acid value of 10 eq/ton was obtained in the esterifying reaction at a reduced pressure and a low reaction temperature for a short residence time. The total reaction time in this case was 5.2 hours and it was confirmed that polybutylene terephthalate can be produced continuously with a good efficiency in the apparatus layout under the reaction conditions of the present invention. Furthermore, to lower the acid value of PBT it is effective to lower the temperature and shorten the residence time in the final polymerization reaction step.

TABLE 1

| | B/T (molar ratio) | Production rate | T1 (g/10$^6$ g) | Direct esterifying | | | Initial polymerization reaction step | | | Final polymerization reaction step | | | | Intrinsic viscosity IV (dl/g) | Acid value AV (eq/ton) |
|---|---|---|---|---|---|---|---|---|---|---|---|---|---|---|---|
| | | | | Temp. (° C.) | Pressure (kPa) | Time (h) | Temp. (° C.) | Pressure (kPa) | Time (h) | Temp. (° C.) | Pressure (kPa) | Time (h) | Number of rotation (rpm) | | |
| Example 1 | 1.8 | 50 (kg/h) | 100 | 228 | 53.3 | 1.8 | 255 | 3.33 | 2 | 245 | 0.13 | 1.4 | 1.5 | 0.85 | 10 |
| Example 2 | 1.8 | 50 (kg/h) | 100 | 230 | 78.5 | 2 | 255 | 3.33 | 2 | 250 | 0.2 | 1.4 | 1.5 | 0.85 | 13 |
| Example 3 | 1.8 | 50 (kg/h) ~300 (ton/day) | 100 | 228~230 | 78.5 | 2.0 | 255 | 3.33 | 2 | 245 | 0.13 | 2 | 1.5 | 0.85 | 10~20 |

What is claimed is:

1. A process for continuously producing polybutylene terephthalate, which comprises a first step of reacting an aromatic dicarboxylic acid comprising terephthalic acid as a main ingredient or a derivative thereof with a glycol comprising 1,4-butanediol as a main ingredient in a first reactor, thereby producing an oligomer with an average degree of polymerization of 2.2 to 5, a second step of polycondensing the oligomer from the first step in a second reactor, thereby preparing a low polymerization product with an average degree of polymerization of 25 to 40, and a third step of further polycondensing the low polymerization product from the second step in a third reactor to an average degree of polymerization of 70 to 130, thereby producing a high molecular weight polyester, with good heat stability and excellent hydrolysis resistance, the third reactor being a horizontal cylindrical vessel type reactor having an inlet and an outlet for a process solution at lower parts on one end and on another end in the longitudinal direction of the vessel proper, respectively, and an outlet for volatile matters at the upper part of the vessel proper, and a stirring rotor rotating in the proximity of the inside wall of the vessel proper being provided in the longitudinal direction of the vessel proper, the stirring rotor being made of a plurality of stirring blade blocks in accordance with the viscosity of the process solution, and the stirring blades being without any rotating shaft along the center of the stirring rotor.

2. A process for continuously producing polybutylene terephthalate, which comprises a first step of reacting an aromatic dicarboxylic acid comprising terephthalic acid as a main ingredient or a derivative thereof with a glycol comprising 1,4-butanediol as a main ingredient in a first reactor, thereby producing an oligomer with an average degree of polymerization of 2.2 to 5, a second step of polycondensing the oligomer from the first step in a second reactor, thereby preparing a low polymerization product with an average degree of polymerization of 25 to 40, a third step of further polycondensing the low polymerization product from the second step in a third reactor to an average degree of polymerization of 70 to 130, thereby producing a high molecular weight polyester, and a fourth step of further polycondensing the polyester from the third step in a fourthreactor to an average degree of polymerization of 150 to 200, thereby producing a high molecular weight polyester with good heat stability and excellent hydrolysis resistance, the fourth reactor being a horizontal, approximately cylindrical vessel type reactor having an inlet and an outlet for a process solution at lower parts on one end and on another end in the longitudinal direction of the vessel proper, respectively, and an outlet for volatile matters at the upper part of the vessel proper, the reactor having two stirring rotors rotating in the proximity of the inside wall of the vessel proper in the longitudinal direction of the vessel proper, and the rotors each having stirring blades.

3. A process for continuously producing polybutylene terephthalate, which comprises a first step of reacting an aromatic dicarboxylic acid comprising terephthalic acid as a main ingredient or a derivative thereof with a glycol comprising 1,4-butanediol as a main ingredient in a first reactor, thereby producing an oligomer with an average degree of polymerization of 2.2 to 5, a second step of polycondensing the oligomer from the first step in a second reactor, thereby preparing a low polymerization product with an average degree of polymerization of 25 to 40, and a third step of further polycondensing the low polymerization product from the second step in a third reactor to an average degree of polymerization of 70 to 130, thereby producing a high molecular weight polyester, with good heat stability and excellent hydrolysis resistance, wherein the aromatic dicarboxylic acid comprising terephthalic acid as a main ingredient or a derivative thereof and the glycol comprising 1,4-butanediol as a main ingredient are supplied to the first step in a molar ratio of the former to the latter of 1:1.7 to 1:3.0.

4. A process according to claim 1, wherein the aromatic dicarboxylic acid comprising terephthalic acid as a main ingredient or a derivative thereof and the glycol comprising 1,4-butanediol as a main ingredient are supplied to the first step in a molar ratio of the former to the latter of 1:1.7 to 1:3.0, and the first step is carried out at 220°–250° C. and 33 kPa–150 kPa, the second step at 230°–255° C. and 100 kPa–0.133 kPa and the third step at 230°–255° C. and 0.665 kPa–0.067 kPa.

5. A process according to claim 2, wherein the aromatic dicarboxylic acid comprising terephthalic acid as a main ingredient or a derivative thereof and the glycol comprising 1,4-butanediol as a main ingredient are supplied to the first step in a molar ratio of the former to the latter of 1:1.7 to 1:3.0, and the first step is carried out at 220°–250° C. and 33 kPa–150 kPa, the second step at 230°–255° C. and 100 kPa–0.133 kPa and the third and fourth step each at 230°–255° C. and 0.665 kPa–0.067 kPa.

6. A process according to claim 1, wherein the stirring blades of the third reactor are rotated in a range of 0.5 rpm–10 rpm.

7. A process according to claim 2, wherein the stirring blades of the third and fourth reactors are rotated in a range of 0.5 rpm–10 rpm.

8. A process according to claim 1, where total reaction time for the first to the third steps is in a range of 4–7.5 hours.

9. A process according to claim 2, wherein total reaction time for the first to the fourth step is in a range of 6 to 8.5 hours.

10. A process according to claim 1 or 2, wherein a slurry of the aromatic dicarboxylic acid comprising terephthalic acid as a main ingredient or a derivative thereof and the glycol comprising 1,4-butanediol as a main ingredient prepared in a ratio of the former to the latter of 1:1.7 to 1:3.0 is supplied to the first step upon admixture of an esterifying catalyst or a polymerization reaction catalyst.

11. A process according to claim 2, wherein another third reactor or a plurality of third reactors is provided in parallel to the third reactor in the third step.

* * * * *